(12) United States Patent
Richart

(10) Patent No.: US 6,299,937 B1
(45) Date of Patent: Oct. 9, 2001

(54) METHODS AND MEANS FOR MODIFYING THE SURFACES OF POLYMERIC SOLIDS

(76) Inventor: Douglas S. Richart, 6 Golfview La., Reading, PA (US) 19606

( * ) Notice: Subject to any disclaimer, the term of this patent is extended or adjusted under 35 U.S.C. 154(b) by 0 days.

(21) Appl. No.: 09/444,339

(22) Filed: Nov. 19, 1999

Related U.S. Application Data

(63) Continuation-in-part of application No. 08/958,751, filed on Oct. 25, 1997, now abandoned.
(60) Provisional application No. 60/029,647, filed on Oct. 28, 1996.

(51) Int. Cl.$^7$ .................................................... B05D 7/00
(52) U.S. Cl. ......................... 427/222; 427/212; 427/307
(58) Field of Search .................................. 427/212, 222, 427/307, 444; 264/15, 117

(56) References Cited

U.S. PATENT DOCUMENTS

| | | | |
|---|---|---|---|
| 4,774,137 | * 9/1988 | Alberts et al. | 428/407 |
| 5,043,280 | * 8/1991 | Fischer et al. | 435/235.1 |
| 5,399,597 | * 3/1995 | Mandel et al. | 523/342 |
| 5,474,803 | * 12/1995 | Kikuchi | 427/180 |
| 5,766,637 | * 6/1998 | Shine et al. | 424/497 |
| 6,087,003 | * 7/2000 | Benoit et al. | 428/403 |

OTHER PUBLICATIONS

Kirk–Othmer Encyclopedia of Chemical Technology, 4th Edition, "Plastics Processing", vol. 19, p. 291, 1996 (no month).*

* cited by examiner

Primary Examiner—Shrive P. Beck
Assistant Examiner—Jennifer Calcagni
(74) Attorney, Agent, or Firm—Richard O. Church

(57) ABSTRACT

The surfaces of particulate polymers are modified by tackifying the surfaces with a liquid that is normally a gas at room temperature. The treatment is carried out while the gas is in its supercritical range and the surfaces of the particulate polymers are at temperatures below the glass transition temperature (Tg) of the polymers. The surface modifications can include adhering solids to the surfaces, altering the surface configuration of the particles and increasing the size of the particles by controlled agglomeration.

12 Claims, 2 Drawing Sheets

METHODS AND MEANS FOR MODIFYING THE SURFACES OF POLYMERIC SOLIDS

RELATED APPLICATION

This application is a continuation-in-part application based upon and claiming priority from U.S. patent application Ser. No. 08/958,751 filed on Oct. 25, 1997 (Abandoned) entitled "Methods and Means for Modifying the Surfaces of Polymeric Solids" which in turn claims priority from United States provisional patent application Ser. No. 60/029,647 filed on Oct. 28, 1996 entitled "Methods and Means for Adhering Solids to Finely Divided Solids." My co-pending U.S. patent application Ser. No. 08/669,143 filed on Jun. 24, 1996 now U.S. Pat. No. 5,854,311, is a related application which discloses the use of liquefied gases in processing coating powders. The disclosures contained in the patent application, in so far as they relate to and define liquefied gases, are here incorporated by reference.

SUMMARY OF THE INVENTION

This application relates to methods and means for modifying the surfaces of particulate solid polymers. More particularly, the invention relates to methods and means for tackifying the surfaces of polymeric materials variously to adhere solids to their surfaces, to alter their surface geometry and to achieve controlled agglomeration of the particulate solids.

BACKGROUND OF THE INVENTION

1. Field of the Invention

The invention finds particular utility, for example, in preparing polymeric coating compositions in which pigments, metal powders and flakes, catalysts, silica, mica, charge control agents and other particulate solids are adhered to the surfaces of the compositions. The compositions may be used in fusion coating processes including those which utilize electrostatic deposition. Another suggested field of use of the invention is in the preparation of pharmaceuticals in which solid active ingredients are adhered to particulate polymers, carriers or diluent materials. For ease and clarity of description, the invention is described with particular regard to the formulation of coating powders for use in fusion coating processes although it should be understood that it is not intended that the invention be so limited.

2. Description of the Prior Art

Coating powders are widely used in fusion coating processes in which decorative and protective coatings are applied to metals and other substrates. Because they contain no solvents or volatile organic compounds (VOC's), they are replacing solvent based coatings to prevent the discharge of VOC's to the atmosphere. Coating powders are usually based on thermosetting resin systems comprising a resin, curing agents or another co-reactable resin, additives to control surface tension, gloss, resistance to light and heat, pigments and fillers to control color and reduce cost, and catalysts to reduce the temperature required for curing or to promote faster curing at a higher temperature. A more complete description of coating powders and powder coating processes can be found in the Kirk-Othmer *Encyclopedia of Chemical Technology*, volume 6, starting on page 635 (1993).

In the early stages of powder coating technology, powders were sometimes mixed by a dry blending process. Here the ingredients were mixed, as in a ribbon blender, ball or impact mill while the powders were maintained at temperatures below their melting point. These processes are no longer used since the processed powders vary in composition from one particle to the next and can not reliably be applied with uniformity of appearance and degree of cure.

Today coating powders are usually made in melt mixing processes in which all the ingredients are thoroughly mixed and dispersed at elevated temperature above the melting point of the base resins, typically in a mixing extruder. The extrudate is cooled, broken into coarse chips and then ground to a fine powder, as in an air impact mill. Typical coating powders have a median particle size of about 30–35 $\mu$m and usually have no particles larger than about 180 $\mu$m. Powders made by this method are substantially uniform in that each particle contains the starting ingredients in the proportions in which they were initially included in the formulation.

The temperatures at which coating powders are mixed, transported and stored and used in fusion coating processes impose a number of requirements. First, in order to retain the formulated coating powders in a free flowing condition during normal shipping, storage and handling, it is obvious that their softening temperature must be well above anticipated ambient conditions. To insure this result, coating powders should have a glass transition temperature, Tg, of at least about 50° C., and preferably higher.

Opposing this requirement for a moderately high Tg is the need to provide coating powders having low melt viscosities at comparatively low temperatures that provide for satisfactory flow, leveling and cure at the lower temperatures. Coating powders that can be applied at comparatively low temperatures find utility, for example, in the application of clear coats in automotive applications. Typically, a clear coat is applied over plastic or other components that can be harmed at high curing temperatures.

There are other applications where powders which cure at comparatively low temperatures are desired, for example, the coating of heat sensitive articles or assemblies that contain wood, rubber or plastic components. Catalysts are used to increase the rate at which the resin will cure at low temperatures, but they can only be used at relatively low levels. If higher levels are used, the curing reaction may proceed too rapidly in the mixing extruder, leading to an undesirable increase in melt viscosity and loss of flow in the final powder. In extreme cases, excessive cross linking in the extruder will cause gelation of a thermosetting mixture rendering it useless in powder coating processes.

Thermosetting coating powders that are too reactive at low temperatures may react under ambient conditions while being transported or stored. In practical terms, the melt flow of reactive powders may continue to decrease over a matter of days or several months, to the point where they will no longer adequately flow during application. Even currently available commercial powders show a decrease in flow during storage to some degree and the useful life is typically about one year. Very reactive powders, such as those in coating pipe and reinforcing bars (rebar), have a more limited storage life and may require refrigerated shipping and storage. The ability of a powder to retain good melt flow characteristics during storage is frequently referred to as storage stability.

In addition to extending the storage stability of coating powders, it is sometimes desirable to modify their surface characteristics. For example, if a semiconductive coating is needed to bleed static electric charges from sensitive electrical devices, conductive solids like carbon black may be incorporated into the coating powders. The conductive carbon particles are more effective in reducing resistivity if the carbon particles are adhered to the surface of the coating powders rather than being melt mixed in and encapsulated by the insulating coating powders. Similarly, the triboelectric charging characteristics of a powder is improved if a triboelectric additive is adhered to the surface of and not encapsulated in the coating powders since the triboelectrification of a particle occurs only on its surface.

Aluminum, mica, silica and pigment flakes are used to formulate coating powders that will exhibit a metallic appearance. If these solids are encapsulated in the coating powders, their decorative effectiveness will be concealed. Further, if mixed with the coating powders under conditions of high shear, as in a mixing extruder, the flakes can be ground into such small particles that the metallic effect provided by the solid in flake form is lost and the finish that results from such a coating powder has a dull, gray appearance.

Seemingly the easiest way in which to preserve the identity of the flakes is to dry blend the metal flakes with the coating powder rather than melt mixing them. Unfortunately, the metal flakes may segregate during conventional storage and handling resulting in coatings with irregular and poor surface characteristics. It should also be understood that, in electrostatic coating processes, coating powders are sprayed through a gun and a high voltage corona discharge is used to establish an ionized field. As the powder particles pass through the through the ionized field, they become charged and are attracted to the substrate, which is usually a metallic article to be coated. Subsequently, the powder is fused into a smooth, continuous film. The powder that is not deposited on a substrate is collected in a reclamation system and recycled by mixing the over-spray with virgin coating powders. When metal flakes are loosely mixed with and segregate from the coating powders, the flakes are not charged to the same extent or deposited at the same rate as the coating powders. Over a period of time, the amount of flake in the coating powders will continually increase until a point is reached at which the high concentration of metal flakes interferes with the charging mechanism. If the powder in the ionized field becomes too conductive, the electrostatic gun may "short out". Further, the appearance of the coatings will change as the ratio of flakes to powder changes. It is for these reason that it is important that the solid flake materials be adhered to the surfaces of the coating materials bearing in mind, as discussed above, that it is important that this be accomplished without coating over the surfaces of the flakes as by melt mixing the flakes into the matrices of the coating powders.

For any or all of the above reasons, it is often desirable to mix solid materials with coating powders at temperatures below the melting point of the powders and deposit and attach the flakes to the surface of the powder particles first, so they retain their functional purpose, second, so they properly modify the surface appearance if desired and third, in the case of catalysts, so that they do not prematurely cause the coating powders to begin to cure.

The Prior Patent Art

Several different methods are known to the prior art for variously adhering particulate solids to the surface of powders or impregnating powders with particulate solids.

U.K. Patent Specification 1,404,556 describes coating powders in which aluminum flakes are imbedded into the powder by milling, e.g, in a ball-mill. Since the flakes may be significantly fragmented, the coating powders produced by this method do not achieve the luster of comparable solvent-based metallic paints.

U.S. Pat. No. 3,632,369 discloses a method of mixing dry plastic particles with dry pigments in a high-speed mixer. By maintaining the mixer blades blade at a high angular velocity, the pigment is adheres to the plastic without agglomerating the particles.

U.S. Pat. No. 4,197,351 describes brush polishing a dry mixture of metal flakes and plastic powder so as to embed the flakes into the powder. Although the coating powder obtained may have a high luster, the brush polishing method described in this patent is impractical for industrial scale production of coating powders.

U.S. Pat. No. 4,598,006 is an impregnation process in which active agents are impregnated into pharmaceutical compounds by use of swelling agents.

U.S. Pat. No. 4,820,752 discloses a method of infusing an additive into a polymer by using a compressed fluid that is normally a gas at room temperature. The polymer has some degree of solubility in the compressed gas.

U.S. Pat. No. 5,187,220 adheres a flake material to the surface of coating powders that have been softened by heating the coating powders to close to their melting point. Sufficient mechanical shear is imparted to prevent the agglomeration of the coating powders.

U.S. Pat. No. 5,470,893 discloses a method in which composite particles are formed by the agglomeration of individual particles by mechanical means.

SUMMARY OF THE INVENTION

It is an object of this invention is to prepare coating powders that cure at low temperatures but which can be processed, prior to the addition of catalysts and accelerators, by usual techniques in a mixing extruder.

Another object of this invention is to provide a process for the preparation of reactive powders having good storage stability but which cure rapidly at elevated temperatures.

A further object of this invention is to adhere catalysts, metal flake, pigments, conductive solids and flake pigments to the surface of fusion coating powders.

Another object of the invention is to alter the conductivity, tribo-electric charging characteristics and surface appearance of fusion coating powders and the coatings made from the coating powders.

Yet a further object of the invention is to make efficient utilization of particulate materials in altering the surface properties of fusion coating powders and the coatings made from the coating powders.

Another object of this invention is to alter the surface geometry of fusion coating powders and make them more nearly spherical.

Another object of this invention is to agglomerate fusion coating powders under controlled conditions to form larger particles.

These and other objects of the invention are accomplished by contacting coating powders with a fluid which is normally a gas at room temperature and pressure, adjusting the temperature and pressure to establish the gas in its supercritical range, solvating the surfaces of the coating powders with the fluid to make the surfaces tacky and agitating the coating powders during treatment to prevent uncontrolled agglomeration.

For purposes of the within specification and the appended claims, the supercritical and the near supercritical phases that are effective to solvate resins arc collectively defined as the "supercritical range." Thus "supercritical range" is used to mean those conditions of temperature and pressure at which a compound that is normally a gas at room temperature is at, or sufficiently close to, its supercritical phase to be effective in tackifying the surfaces of the resins by at least the partial solvation of the surfaces of the resins. When it is desired to adhere particulate solids, the solids are contacted while the surfaces of the powders are tacky. The process is discontinued by changing the pressure or temperature conditions to relieve the gas from the supercritical range and bleeding the gas away from the powders. This results in nontacky, free flowing powders which have altered surface characteristics, that is the surfaces may more nearly approach a spherical shape without jagged corners or the powders may have solids adhered to their surfaces.

The invention is based on the fact that many gases, while in their supercritical range, solvate the surface of resin particles and make them tacky. The maximum solvating power of bases is observed at the supercritical phase of the gases but significant solvating power is also observed at conditions approaching the supercritical phase. It is usually easier to conduct the surface solvation of powders in this invention at ambient temperatures to avoid heating or cooling of the treatment vessel. Assuming that the treatment gas is carbon dioxide, the supercritical range begins at room temperature (i.e. about 20° C.) at pressure of about 820 psi. In theory, any temperature or pressure above these given values for carbon dioxide can be exceeded while staying within the defined "supercritical range." Under these conditions the resin particles will not adhere to each other provided a sufficient amount of agitation (kinetic energy) is imparted to the resin particles. Utilizing the above method of the invention, the lowest conveniently practical temperature and pressure should be used, together with a short processing time, so as to adhere the additives to the surface of the particles without diffusing them into the interior of the particles. As previously mentioned, it highly desired that the processing temperatures do not exceed the glass transition temperature (Tg) of the resins so that the resin particles will not melt. By controlling the process temperatures, pressures and the design of the mixing apparatus, powder particles can be made that are more nearly spherical while preventing the powder particles from agglomerating into clusters. In some cases it is desirable to controllably agglomerate smaller particles to form larger particles. In this case the conditions of temperature and pressure are adjusted to give a higher degree of salvation while at the same time controlling the level of the agitation. Roth a pressurized reactor (batch process) or a pressurized gas continuously flowing through a tube (continuous process) can be used to effect these results.

DETAILED DESCRIPTION OF THE INVENTION

Both of the figures are photomicrographs taken with a Leica NH-T confocal microscope utilizing an ultra primary laser and a secondary laser in the visual range at a magnification of 225×. The two lasers are used to take sectional photomicrographs and the sections are assembled to construct a composite with a greater depth of field. The white (or blank and sometimes shiny spots) in the photomicrographs are aluminum flakes and the darker objects that appear in the photomicrographs are resin particles. It may be noted that the photomicrographs were taken in color and that the drawings submitted with this application are black and white copies of the original color photomicrographs.

Figure 1:
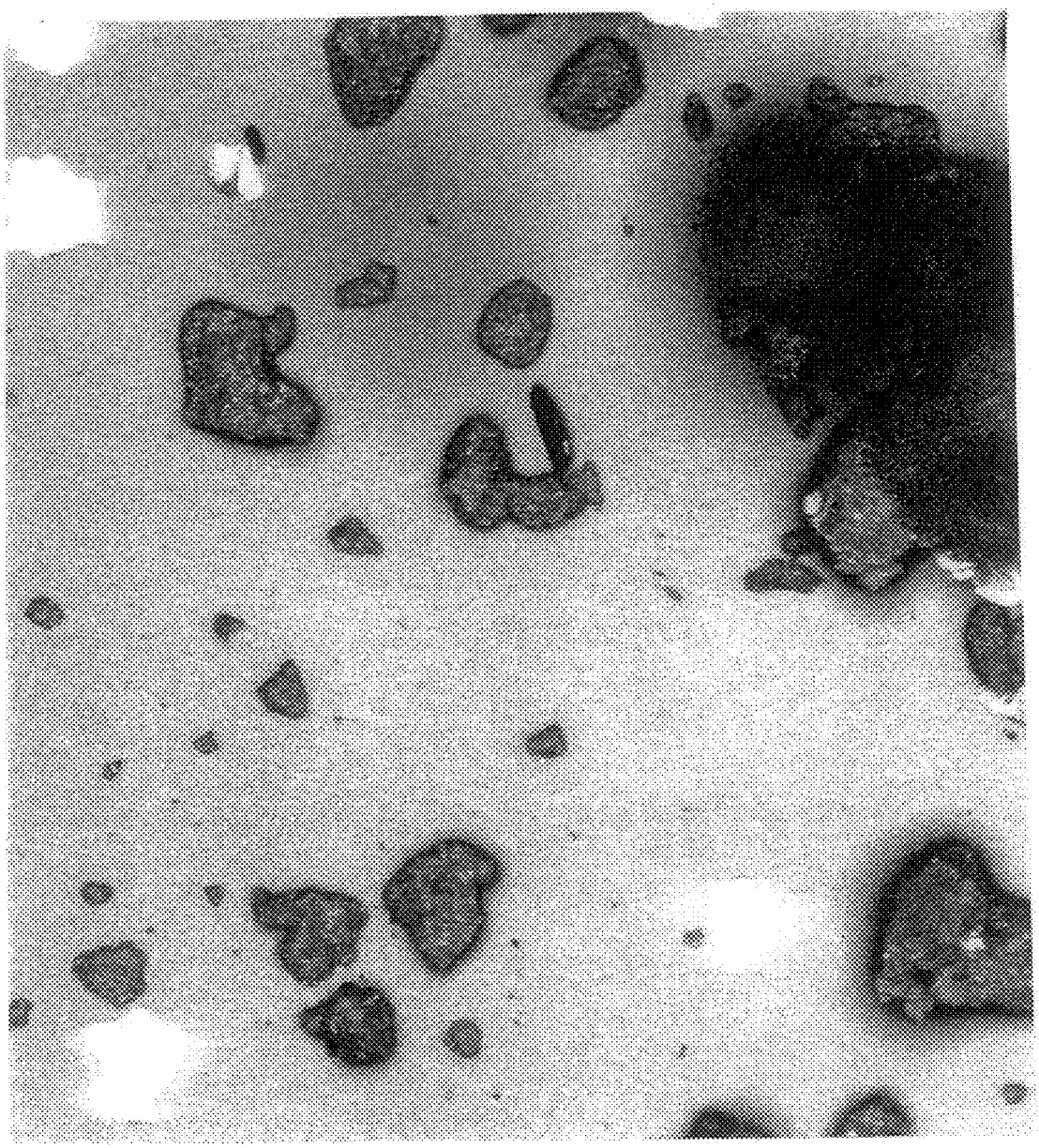
FIG. 1 is a photomicrograph of a resin mixture prior to treatment in accordance with this invention.

In FIG. 1 is a photomicrograph taken of the resin mixture (i.e. epoxy coating, powder and aluminum flake) of Example 3 before the mixture was treated in accordance with the method of this invention. The photomicrograph clearly shows a number of discrete aluminum particles (blank spaces) that are not associated with any of the resin particles. The resin particles are distinguished by the large differences in the size of the particles and the many small particles. It can be observed that the resin particles are irregular in shape and have many sharp edges. The size and configuration of the resin particles here shown are typical of the characteristics of ground resins powders.

Figure 2:
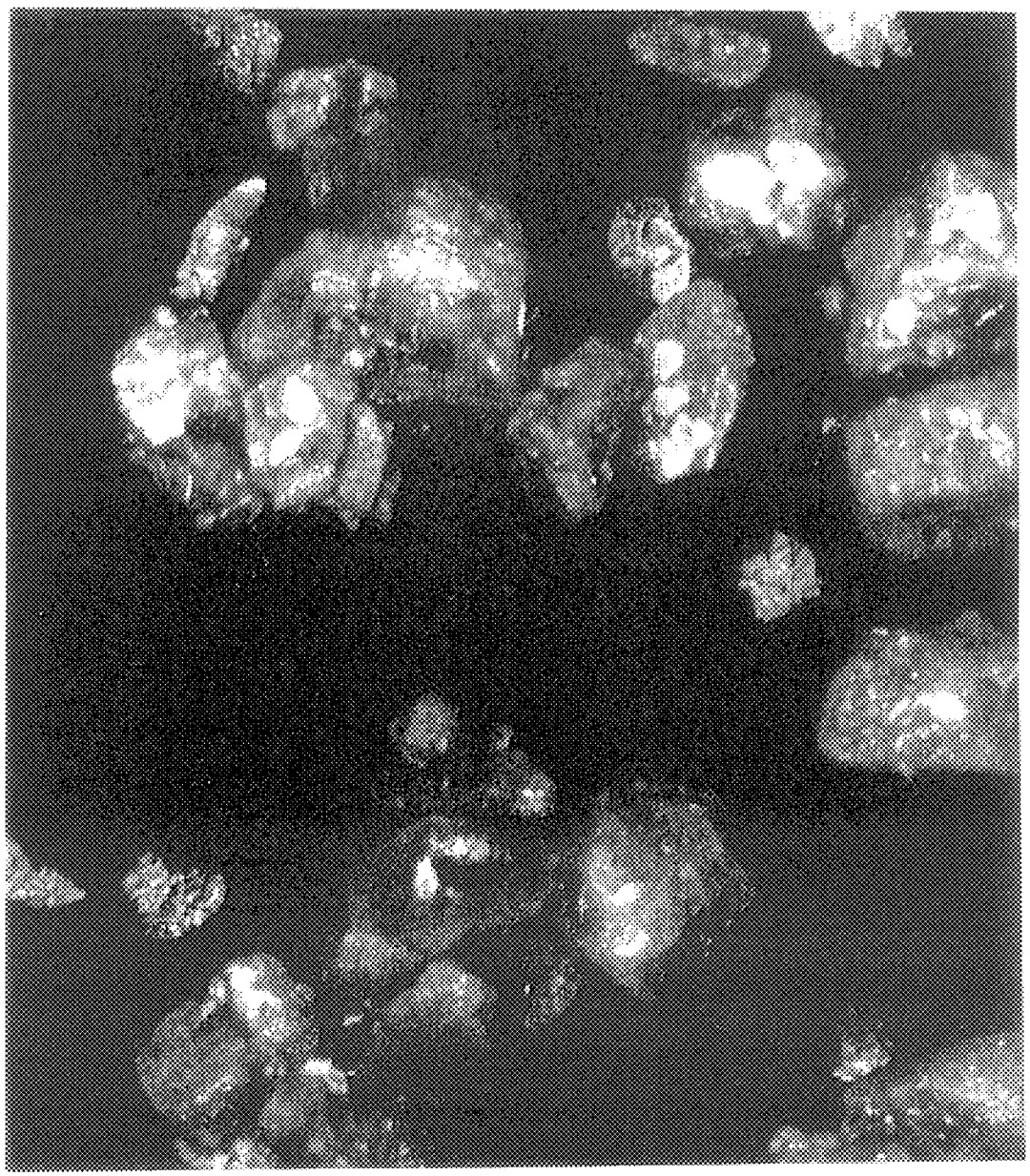
FIG. 2 is a photomicrograph of a resin mixture after it has been treated in accordance with this invention.

FIG. 2 is a photomicrograph taken of the resin blend that was formed after treatment in the process of Example 3. Here it can be seen that there are no disassociated aluminum particles because they have adhered to the resins during the treatment with liquid carbon dioxide. Additional benefits were obtained through the use of the process of Example 3. Note that agglomerates were formed and that there is almost a total absence of the very fine particles that are seen in FIG. 1. Finally, note how the configuration of the particles has changed in that most of the edges have been rounded and not sharp like those of FIG. 1.

These photomicrographs support the instant invention and its objectives of preparing coating powders to which solid particles are adhered to the surfaces of the powder, of preparing coating powders that are substantially free from ultra fine particles and of preparing coating powders have rounded edges.

EXAMPLES

In the following examples, an apparatus used for supercritical extraction studies was utilized to evaluate the characteristics of polymers and polymeric mixtures normally used in the manufacture of coating powders treated with liquefied carbon dioxide in the supercritical range.

Example 1

10 g. of powder chips of a coating powder resin mixture compounded in a mixing extruder were thoroughly mixed with 0.38 g. of aluminum powder flake designated LE 2993 AR from Silberline Manufacturing Co. The powder chips were a standard coating, powder composition comprising epoxy resins, a curative, an acrylic flow control additive, pigments and fillers. The mixture of coating powder chips and aluminum powder were charged into the center of a 50 ml capacity extraction cylinder. At each end of the cylinder, polypropylene fiber packing was inserted occupying approximately 20% of the cylinder volume. End plugs, with a threaded hole for attachment high pressure tubing, were screwed in each end of the cylinder until pressure tight. Tubing with pressure fittings were connected through a valve to a carbon dioxide cylinder, to the bottom plug of the extraction cylinder. Similar tubing was connected to the top of the cylinder and to a flow meter subsequently vented to the atmosphere. The cylinder was mounted in an oven to permit control of the temperature between ambient and approximately 120° C.

The outlet valve of the carbon dioxide cylinder was opened and the inlet valve to the extractor opened and adjusted to give a gas flow rate through the apparatus of 3 liters per minute. The liquid carbon dioxide was delivered from the cylinder at ambient temperature, 25° C., and cylinder pressure, 820 psi, and allowed to flow through the extraction cylinder for 30 minutes. After 30 minutes, the flow of carbon dioxide was stopped by closing the inlet valve and the pressure in the cylinder allowed to dissipate at a flow rate of 3–5 l/min. until it was at atmospheric pressure. The high pressure tubing was removed from the extraction cylinder, the cylinder removed from the oven and the cylinder opened by removing the end caps. The polypropylene fiber plug was removed from the end of the cylinder and the charge of resin chips and aluminum flake removed. The aluminum flake was tightly adhered to the resin mixture chips and could not be removed by rubbing. In contrast, when the initial mixture of resin chips and aluminum flake was subjected to a rubbing action before this treatment, the aluminum flake was easily removed, exposing the surface of the resin mixture chips.

Example 2

The procedure of Example I was repeated except that 10 g. of a powder prepared by grinding the resin mixture chips was mixed with 0.30 g. of aluminum powder. The powder had an average particle size of 30–35 μm and all particles passed through a 100 mesh screen. After 30 minutes exposure to carbon dioxide flowing at 31/min., at a temperature of 24° C. and 820 psi, the cylinder was opened and the powder mixture with aluminum flakes examined. In this case, the powder had agglomerated to form a solid plug which could only be broken apart with some difficulty. This indicates that the small particles were solvated to a greater extent than the resin chips of the same composition and that in order to prevent excessive particle agglomeration, the particles should be agitated when exposed to the liquid carbon dioxide, so they are kept in motion relative to each other and the aluminum flake.

The beneficial effects, that is preventing excessive agglomeration of relatively small particles (e.g. less than about 500 μm) by agitating the particles while exposed to the liquid carbon dioxide is demonstrated in the following Examples 3 and 4.

Example 3

250 g. of the epoxy coating powder of Example 2 and 7.5 g. (3%) of LE 2993 AR aluminum flake were dry blended together and mixed with a stirring rod. FIG. 1 is a photomicrograph representative of this mixture. In the photomicrograph the aluminum flakes appear as lighter and shinier objects while the resin particles appear as darker objects. It can also be seen that there is a scattering of objects of different sizes.

The mixture was charged into a 1 liter pressurized reactor equipped with an agitator, fluid inlet and outlet valves and temperature and pressure gauges. (Pressure Products Industries, Inc. Model LC Reactor) Liquid carbon dioxide from a standard cylinder was admitted to the reactor and agitation started at 600 rpm. After 2 minutes, the pressure in the stirred reactor registered approximately 800 psig, the same as the pressure of the cylinder, and the temperature, 26° C. The reactor was stirred for 30 minutes under these conditions, at which time agitation was stopped and the pressure released over a period of 3–¾ minutes. The reactor was opened and the coating powder with aluminum flakes were recovered. On examination under 10× magnification, many aluminum flakes were attached to epoxy powder particles and could not be removed by mechanical manipulation. Some of the powder particles were slightly agglomerated but were easily broken up by light agitation to their original size.

FIG. 2 is a photomicrograph representative of the powder particles discharged from the reactor. Comparing FIG. 1 and FIG. 2 it can be seen that the treatment of Example 3 as shown in FIG. 2 produced larger, more uniform shaped particles with the absence of the very tine particles. Particularly note that the lighter particles (aluminum flake) appear to be attached to the surfaces of the darker particles (resin) and have lost their independent existence. This illustrates that the treatment of resin particles in accordance with the procedures of this invention result in the adherence of solid particles to the surface areas of the resins.

Example 4

A trial was carried out as in Example 3 except only 160 g. epoxy powder and 3% aluminum flake were charged to the reactor. The powder particles and aluminum flake were maintained in contact with each other by stirring at 600 rpm for 10 minutes at ambient temperature and a pressure of 800 psig. The vessel was depressurized over a period of 4 minutes with no agitation. As in Example 3, aluminum particles were firmly attached to the epoxy powder particles and could not be separated by rubbing. There was no agglomeration of the particles.

What is claimed is:

1. A method of adhering solid particles to the surface of polymeric powders which comprise the steps of:

mixing the particles and the powders in a gas that is maintained in a supercritical range but at a temperature below the glass transition temperature of the powders, solvating the surfaces of the powders to render them tacky without dissolving the powders, mixing the particles with the powders while the surfaces of the powders are tacky to adhere the particles to the powders;

changing the conditions of temperature and pressure to remove the gas from the supercritical range and render the gas ineffective to solvate the polymeric powders further; and separating the particle coated polymeric powders from the gas.

2. A method according to claim 1 wherein the powders are maintained in constant motion while in contact with the gas in the supercritical range to prevent uncontrolled agglomeration of the powder.

3. A method for the treatment of heat fusible powders by contacting the powders in a gas that is maintained in the supercritical range at a temperature below the glass transition temperature of the powders, solvating only the surfaces of the powders to cause the surfaces to become tacky, maintaining the powders in constant motion by the application of shear forces to prevent uncontrolled agglomeration of the powders, changing the conditions of temperature and pressure to remove the gas from the supercritical range and render the powder substantially nontacky, and separating the powder from the gas.

4. A method according to claim 3 wherein some of the sharp edges of powders are rounded during treatment in the gas while the gas is in the supercritical range.

5. A method according to claim 3 wherein the powders are controllably agglomerated during treatment in the gas while the gas is in the supercritical range.

6. A method according to claim 1 wherein the polymeric powders are adapted for use in fusion coating processes and have a glass transition temperature above about 50° C.

7. A method for adhering particulate solids to heat fusible resins by contacting a mixture of resins and particulate solids in a fluid which is normally a gas at room temperature and pressure, adjusting the temperature and pressure to place the fluid in a super critical range but at a temperature below the glass transition temperature of the resins, tackifying the surfaces of the resins by contact with the fluid in the supercritical range, adhering the particulate solids to the solvated tacky surfaces of the resins, adjusting the conditions of pressure and temperature to exit the fluid from the supercritical state range and separating the gas from the particulate coated resins.

8. A method for adhering particulate solids to heat fusible resins according to claim 7 in which a batch process is utilized.

9. A method for adhering particulate solids to heat fusible resins according to claim 7 in which a continuous process is utilized.

10. A method for adhering particulate solids to heat fusible resins according to claim 7 wherein the resin is thermoplastic.

11. A method for adhering particulate solids to heat fusible resins according to claim 7 wherein the resin is in the form of a resin chip.

12. A method for adhering particulate solids to heat fusible resins according to claim 7 wherein the particulate solids are selected from the group comprising catalysts, electrical conductors, or metallic flakes.

* * * * *